United States Patent [19]

Ishikawa et al.

[11] Patent Number: 5,051,207

[45] Date of Patent: Sep. 24, 1991

[54] HEAT-RESISTANT AND CORROSION-RESISTANT COMPOSITION

[75] Inventors: Toshikatsu Ishikawa, Ohta; Katsuya Tokutomi, Yokosuka; Hiroshi Ichikawa, Yokohama; Shiro Mitsuno, Yokohama; Hideto Nagai, Yokohama, all of Japan

[73] Assignee: Nippon Oil Co., Ltd., Tokyo, Japan

[21] Appl. No.: 397,497

[22] PCT Filed: Dec. 15, 1988

[86] PCT No.: PCT/JP88/01274

§ 371 Date: Aug. 16, 1989

§ 102(e) Date: Aug. 16, 1989

[87] PCT Pub. No.: WO89/06261

PCT Pub. Date: Jul. 13, 1989

[30] Foreign Application Priority Data

Dec. 28, 1987 [JP] Japan .............................. 62-329724

[51] Int. Cl.$^5$ .............................................. C23F 11/00
[52] U.S. Cl. ........................... 252/389.31; 252/389.52; 252/389.1; 502/1; 106/14.41; 106/14.05

[58] Field of Search ...................... 252/389.23, 389.52, 252/389.1, 389.3, 389.31, 445, 446, 447; 106/445, 446, 447, 14.39, 14.41, 442, 14.05, 438, 426, 428, 429; 502/1

[56] References Cited

U.S. PATENT DOCUMENTS

| | | | |
|---|---|---|---|
| 4,359,559 | 11/1982 | Yajima et al. | 525/475 |
| 4,608,420 | 8/1986 | Brindopke et al. | 525/375 |
| 4,681,860 | 7/1987 | Bujalski | 501/90 |
| 4,808,659 | 2/1989 | Nishihara et al. | 525/477 |
| 4,837,230 | 6/1989 | Chen et al. | 501/89 |
| 4,840,666 | 6/1989 | Schmidt et al. | 106/14.41 |

OTHER PUBLICATIONS

*Testing Methods for Organic Coatings, JIS K 5400,* published by Japanese Standards Association, 1979.
JP Abstract No. 62-54768, Nishihara, Yoshio, "Heat Resistant Paint".
JP Abstract No. 63-12672, Nishihara, Yoshio, "Coating Composition".

*Primary Examiner*—Deborah L. Kyle
*Assistant Examiner*—Valerie Fee
*Attorney, Agent, or Firm*—Bucknam and Archer

[57] ABSTRACT

A heat-resistant, corrosion-resistant composition comprising a metal alcoholate, a curing agent, a filler and an organic solvent.

7 Claims, No Drawings

HEAT-RESISTANT AND CORROSION-RESISTANT COMPOSITION

TECHNICAL FIELD

The present invention relates to a heat-resistant, corrosion-resistant composition. More particularly, the present invention relates to a heat-resistant, corrosion-resistant composition which is excellent in such properties as heat resistance, thermal shock resistance, oxidation resistance and non-corrosiveness against a metal and which may be used as a coating material and a binder for ceramics.

BACKGROUND ART

Composition or paints disclosed in Japanese Patent Laid-Open No. (sho.) 54-123146 or No. (sho.) 62-54768 are known as conventional coating compositions. For example, the paint or coating material disclosed in the Japanese Patent Laid-Open No. (sho.) 62-54768 comprises polymethylcarbosilane, a silicone resin, an inorganic filler and an organic solvent, but this coating material is defective in that the hardness and strength in its cured state are poor, the heat resistance and corrosion resistance in its cured state are insufficient and the temperature for curing it is high (at least 250° C.).

Furthermore, conventional binders for ceramics are not excellent in heat resistance, and they will partly remain unchanged even after sintering thereof thereby to make no contribution to the improvement of the ceramics in strength and shock resistance. Accordingly, conventional ceramic moldings require a high-temperature high-pressure baking technique as adopted in the hot-press process to be produced, but they raise problems as to being readily broken by thermal stress.

DISCLOSURE OF THE INVENTION

In view of the above-mentioned problems, the primary object of the present invention is to provide a composition which is excellent in such properties as heat resistance, thermal shock resistance, oxidation resistance and non-corrosiveness against a metal and which is used as a coating material or a binder for ceramics.

In accordance with the present invention, there is provided a heat-resistant, corrosion-resistant composition comprising a metal alcoholate, a curing agent, a filler and an organic solvent.

The metal alcoholate used in the present invention has the following general formula (I) or (II):

$$M(OR)_l \qquad (I)$$

or a copolymer of a polycarbosilane of basic skeleton (SiHRCH$_2$) of degree of polymerization 5-50, and a metal alcoholate of formula (I), wherein M is Zr, Al, Si or Ti, R is alkyl, phenyl or hydrogen, l is 3 or 4.

Inorganic compounds capable of being dehydrated by heating and thermosetting resins are used as the curing agent. The inorganic compounds capable of being dehydrated by heating, referred to herein, are those which can be dehydrated by heating. More specifically, they include boron hydroxide, titanium hydroxide, aluminum hydroxide, zinc hydroxide, yttrium hydroxide, chromium hydroxide, silicon hydroxide, germanium hydroxide, cobalt hydroxide, zirconium hydroxide, tin hydroxide, iron hydroxide, copper hydroxide, lead hydroxide, nickel hydroxide, magnesium hydroxide, manganese hydroxide, molybdenum hydroxide and lanthanum hydroxide. The thermosetting resins, include phenolic resins, methylol urea resins and methylol melamine resins.

The fillers used in the present invention, include powders of ceramics such as α-SiC, β-SiC obtained by molding, insolubilizing and heat-treating a polycarbosilane having a number average molecular weight of 400 to 5000, silicon nitride and alumina. The average particle size of the powder is 0.1 to 1000μ, preferably 0.1 to 10μ for coating materials and preferably 0.1 to 1000μ for binders for ceramics.

The organic solvents include general-purpose solvents such as xylene, toluene, benzene and hexane. It is preferred that the mixing ratio of the foregoing components of the composition of this invention be such that the amounts of the metal alcoholate, the curing agent and the filler are 25 to 80% by weight, 0.1 to 20% by weight and 10 to 70% by weight, respectively, based on 100% by weight of the total solids. It is preferred that the solvent be incorporated in an amount of 10 to 60 parts by weight per 100 parts by weight of the total solids.

More specifically, for coating materials, it is preferred that the amounts of the metal alcoholate, curing agent and filler used be 25 to 70% by weight, 0.1 to 20% by weight and 10 to 60% by weight, respectively, and the amount of the solvent used be 10 to 60 parts by weight per 100 parts by weight of the total solids, thereby to produce a composition having a viscosity of 0.1 to 10 poise.

For binders for ceramics, it is preferred that the amounts of the metal alcoholate, curing agent and filler used be 25 to 80% by weight, 0.1 to 20% by weight and 20 to 70% by weight, respectively, and the amount of the solvent used be 10 to 50 parts by weight per 100 parts by weight of the solids, thereby to produce a composition having a viscosity of 1.0 to 1000 poise.

A process for the preparation of the composition of the present invention will now be described hereunder.

A commercially available metal alcoholate or synthetic metal alcoholate, a size-adjusted curing agent, a size-adjusted filler and an organic solvent are mixed together under stirring in a ball mill or the like, whereby a heat-resistant and corrosion-resistant composition is prepared.

When this composition is used as a coating material for a substrate, the substrate is previously degreased with acetone, trichloroethylene or the like, and if the substrate is a metal, it is previously subjected to a sandblasting treatment. The composition of the present invention is applied onto the substrate by brush coating or air spraying. The coated substrate is heated to be cured. Heat curing can be accomplished by spontaneous drying at normal temperature for about 1 hour, but it is the most preferred that the curing temperature be elevated at a rate of 10° C./hr to 250° C. in air. The thickness of the thus obtained coating is generally 20 to 60μ.

When the composition is used as a binder for ceramics, ceramic grains or ceramic fibers in the form of a chop, cloth, mat or felt of carbon fibers, glass fibers, zirconia fibers, potassium titanate fibers, SiC fibers, alumina fibers or silica-alumina fibers used as the filler and the composition of the present invention used as the matrix, are allowed to stand still for about 1 hour, for example, in air, whereby the matrix is semi-cured to form a prepreg. These prepregs are laminated, molded and fired. The firing is carried out at 400° C. to 2000° C. in a non-oxidizing atmosphere. If necessary, baking is previously carried out while elevating the temperature at a rate of 10° to 100° C./hr to 100°–300° C., and the firing is then carried out under the above-mentioned conditions. Then, the fired body is impregnated with the composition of the present invention at normal temperature to 200° C. and again fired under the same conditions as the above to obtain a desired ceramic body.

EXAMPLES

The present invention will now be described in detail with reference to the following Examples.

EXAMPLE 1

Titanium tetrabutoxide Ti $(OC_4H_9)_4$ and a polycarbosilane [basic skeleton: $(SiHCH_3CH_2)$] having an average molecular weight of 2000 were weighed out to obtain 4.8 kg and 1.2 kg, respectively, and the materials so obtained were reacted at 200° C. for 1 hour in nitrogen in a reaction vessel to effect synthesis of a metal alcoholate. The yield was 95%, and the obtained metal alcoholate had an amber color and was transparent and viscous. When the infrared absorption spectra of the metal alcoholate were measured, feeble C—H stretching vibrations were observed at 2900 $cm^{-1}$ and 2950 $cm^{-1}$ and feeble Si—H stretching vibration was observed at 1260 $cm^{-1}$.

The same polycarbosilane as the one described above was melt-spun to obtain a fibrous molding, and the molding was heated at a temperature-raising rate of 10° C./hr up to 200° C. in air and maintained at this temperature for one hour to render the molding infusible. Then, the molding so rendered infusible was heated at a temperature-raising rate of 100° C./hr up to 1000° C. in nitrogen and maintained at 1000° C. for one hour to effect primary firing. Then the molding so primarily fired was heated at a temperature-raising rate of 100° C./hr up to 2000° C. in argon and maintained at 2000° C. for one hour to effect further firing. The molding so further fired was pulverized to obtain yellow $\beta$-SiC powder. The yield was 75%. The powder so obtained was subjected to X-rays diffraction with $CuK\alpha$ rays with the result that the presence of the planes (111), (200) and (311) of $\beta$-SiC was observed at $2\theta = 36.°, 60°$ and $72.5°$.

Then, 300 g of the obtained metal alcoholate, 400 g of the $\beta$-SiC powder, 300 g of xylene and 20 g of boron hydroxide (average particle size: $4\mu$) were weighed out and mixed together under stirring in a ball mill for 24 hours to form a composition A.

EXPERIMENT 1a

A SUS 304 sheet degreased with trichloroethylene and blasted with sand paper #100 was coated with the composition A obtained in Example 1 with an air spray device (nozzle diameter of 1 mm, spraying pressure of 3.5 kg/cm²). The coated sheet was spontaneously dried to obtain a coating having a thickness of $25\mu$.

The coated SUS sheet was subjected to a heat resistance test at 1000° C. for 100 hours according to JIS K 5400, an acid resistance test using 10% $H_2SO_4$ and an alkali resistance test using 10% NaOH (each for 100 hours). Furthermore, to evaluate the coat for adhesion, a 1-mm square cross-cut test was carried out (JIS K 5400 6-15). The obtained results are shown in Table 1.

TABLE 1

| Test Item | Test Conditions | Results | Standard |
|---|---|---|---|
| heat resistance | 1000° C. 100 hours | no change | JIS K 5400 (7-1) |
| corrosion resistance | 10% NaOH, 100 hours | no change | JIS K 5400 (7-4) |
| | 10% $H_2SO_4$, 100 hours | no change | JIS K 5400 (7-5) |
| adhesion | 1-mm square cross-cut test | good (10 points) | JIS K 5400 (6-15) |

As is apparent from the results shown in Table 1, no change was observed in the heat resistance test and the corrosion resistance test (acid resistance and alkali resistance), while full marks were attained in the square cross-cut adhesion test.

EXPERIMENT 1b AND COMPARATIVE EXPERIMENT 1b

The composition A formed in Example 1 was applied on an artificial graphite material having a bulk specific gravity of 1.68 (Experiment 1b). The thickness of the coating was $50\mu$. When an oxidation resistance test had been carried out at 500° to 600° C. for 29 hours in air, a weight decrease of 3.4% by weight was observed.

In case of the artificial graphite material not coated with the composition A (Comparative Experiment 1b), a weight decrease was 16.1% by weight.

From the foregoing results, it was confirmed that the oxidation resistance of the artificial graphite material was improved by coating the artificial graphite material with the composition A.

EXPERIMENTS 1c AND 1d AND COMPARATIVE EXPERIMENTS 1c AND 1d

The SUS 304 sheet and artificial graphite material used in Experiments 1a and 1b, which were coated with the composition A, were subjected to a test for their resistance to erosion by molten aluminum (aluminum: AC 4C for casting; test conditions: 720° C. for 7 hours in a molten aluminum bath).

In case of the SUS 304 sheet coated with the composition A (Experiment 1c), a weight decrease was 1.9% by weight.

In case of the artificial graphite material coated with the composition A (Experiment 1d), a weight decrease was 6.8% by weight. In case of the SUS 304 sheet not coated with the composition A (Comparative Experiment 1c), a weight decrease was 56.0% by weight. In case of the artificial graphite material not coated with the composition A (Comparative Experiment 1d), weight decrease was 48.3% by weight.

From the foregoing results, the aluminum erosion resistance of the SUS 304 sheet and artificial graphite material was improved by coating them with the composition A.

EXPERIMENT 1e AND COMPARATIVE EXPERIMENT 1e

The composition A obtained in Example 1 was brush-coated on an SS 41 sheet (having a size of 50 mm × 100 mm and a thickness of 2 mm) and the coated sheet was spontaneously dried for one hour. The sheet so dried was heated at a temperature-raising rate of 10° C./hr up to 200° C. in air for heat cure thereby to obtain an SS 41 sheet having a coating thickness of $50\mu$ (Experiment 1e). When this coated SS 41 sheet had been subjected to an aluminum erosion resistance test in the same manner as that described in Experiment 1c and 1d, it was found that a weight decrease was 0.4% by weight.

In case of the SS 41 sheet not coated with the composition A (Comparative Experiment 1e), a weight decrease was 32.7% by weight.

From the foregoing results, it was confirmed that the aluminum erosion resistance of the SS 41 sheet was improved by coating the sheet with the composition A.

EXPERIMENT 1f 12-satin weave, composed of SiC fibers (Trademark: Nikalon), were dipped in the composition A obtained in Example 1, laminated, molded, fired, impregnated and refired to obtain a molding. The molding so obtained was black and dense and had a bulk density of 2.0 g/cm$^3$, and the three-point bending strength thereof was 10 kg/mm$^2$. At the thermal shock of $\Delta T=1000°$ C. (heating at 1000° C. and then throwing in water at normal temperature), the appearance and bending strength of the molding were not changed.

EXAMPLE 2

A metal alcoholate was synthesized in the same manner as that described in Example 1 except that zirconium tetrabutoxide $Zr(OC_4H_9)_4$ was reacted instead of the titanium tetrabutoxide used in Example 1, and a composition B was prepared in the same manner as that described in Example 1 except that this metal alcoholate synthesized herein was used.

EXPERIMENT 2a

In the same manner as that described in Experiment 1a. a SUS 304 sheet was coated with the composition B obtained in Example 2, and the heat resistance test, acid resistance test, alkali resistance test and square cross-cut adhesion test were carried out. No change was observed in the heat resistance test and the corrosion resistance test (acid resistance and alkali resistance), while full marks were attained in the square cross-cut adhesion test.

EXPERIMENT 2b

An oxidation resistance test of the artificial graphite material was carried out in the same manner as the one described in Experiment 1b by using the composition B obtained in Example 2. It was confirmed that the oxidation resistance of the graphite material was improved as in Experiment 1b.

EXPERIMENT 2c

An aluminum erosion resistance test was carried out in the same manner as that described in Experiment 1c by using the composition B obtained in Example 2. It was confirmed that the resistance to erosion by aluminum was improved.

EXAMPLE 3

Titanium tetrabutoxide $Ti(OC_4H_9)_4$ and a polycarbosilane [basic skeleton: $(SiHCH_3CH_2)$] having an average molecular weight of 2000 were weighed out to obtain 4.8 kg and 1.2 kg thereof as the samples, respectively. Then, the samples were reacted at 200° C. in nitrogen for 1 hour in a reaction vessel to effect synthesis of a metal alcoholate. The yield was 95%, and the obtained alcoholate had an amber color and was transparent and viscous. When the infrared absorption spectra were measured, C—H stretching vibrations were observed at 2900 cm$^{-1}$ and 2950 cm$^{-1}$ and Si—Me deformation vibration was observed at 1260 cm$-1$ while feeble Si—H stretching vibration was observed at 2100 cm$^{-1}$.

The same polycarbosilane as the one described above was melt-spun to obtain a fibrous molding, and the molding was heated at a temperature-raising rate of 10° C./hr up to 200° C. in air and maintained at this temperature for one hour to render the molding infusible. Then, the molding so rendered infusible was heated at a temperature-raising rate of 100° C./hr up to 1000° C. in nitrogen and maintained at 1000° C. for one hour to effect primary firing. The molding so primary fired was further heated at a temperature-raising rate of 100° C./hr up to 2000° C. in argon and maintained at 2000° C. for one hour to effect firing. The molding so fired was pulverized to obtain yellow $\beta$-SiC powder. The yield was 75%. The powder so obtained was subjected to X-rays diffraction with Cu K$\alpha$ rays with the result that the planes (111), (200) and (311) of $\beta$-SiC were observed at $2\theta=36.5°$, 60° and 72.5°, respectively.

The obtained metal alcoholate, the B-SiC powder (pulverized to 4$\mu$ with a jet mill), xylene and boron hydroxide were mixed together at a ratio of 4/5/1/0.5, and the mixture was blended under stirring in a ball mill to obtain a composition C.

EXPERIMENT 3a

Woven fabrics (12-satin weave) composed of SiC fibers (trademark: Nicalon) and having a size of 1 m $\times$ 1 m (450 g) were impregnated with 1350 g of the composition C obtained in Example 3, by using a roller and allowed to stand still at room temperature in air for one hour, whereby a prepreg was prepared. Then, 5 sheets of prepregs thus prepared were laminated and molded. The laminate was placed in an autoclave and then the autoclave was evacuated to 76 cm/Hg. The laminate was maintained at a temperature of 200° C. under a pressure of 5 kg/cm$^2$ for 5 hours to obtain a molding. The molding was subjected to primary firing in nitrogen at 800° C. for one hour.

The primarily fired molding was dipped in a composition comprising the metal alcoholate obtained in Example 3, SiC powder, xylene and boron hydroxide at a weight ratio of 3/4/3/1 to impregnate the molding with the composition.

The impregnated molding was spontaneously dried for one hour, and then heated at a temperature-raising rate of 10° C./hr up to 250° C. in air to effect curing. The cured molding was re-fired at 1000° C. for one hour in nitrogen. The obtained fired body was black and dense and had a three-point bending strength of 13 kg/mm$^2$ and a bulk density of 2.0 g/cm$^3$.

In the thermal shock test ($\Delta T=1000°$ C.), neither the appearance nor the bending strength underwent any change.

EXPERIMENT 3b

A fired body was obtained in the same manner as that described in Experiment 3a by using the composition C obtained in Example 3, and 12 satin weave fabrics composed of carbon fibers and having a size of 1 m $\times$ 1 m. The obtained fired body was black and dense and had a three-point bending strength of 15 kg/mm$^2$ and a bulk density of 1.8 g/cm$^3$.

EXPERIMENT 3c

A fired body was obtained in the same manner as the one described in Experiment 3a by using the composition C obtained in Example 3 and a plain weave fabric composed of silica-alumina fibers and having a size of 1 m × 1 m. The obtained fired body was black and dense and had a three-point bending strength of 5 kg/mm².

EXAMPLE 4

Titanium tetrabutoxide Ti(OC₄H₉)₄, α-SiC powder (having an average particle size of 4μ), xylene and aluminum hydroxide were weighed out to obtain 4 kg, 5 kg, 1.2 kg and 0.7 kg thereof as the samples, respectively, and the samples so obtained were sufficiently mixed under stirring in a ball mill to obtain a composition D.

EXPERIMENT 4a

Woven fabrics composed of SiC fibers (trademark: Nicalon) (12-satin weave), which had a size of 1 m × 1 m (450 g), were impregnated with 800 g of the composition D obtained in Example 4 by using a roller, and they were allowed to stand still at normal temperature for one hour in air to obtain a prepreg. Then, 5 sheets of prepregs thus prepared were laminated and molded. The laminate was placed in an autoclave and the interior of the autoclave was evacuated to 76 cm/Hg. The laminate was maintained at 200° C. under a pressure of 5 kg/cm² for 5 hours to obtain a molding, which wqas subjected to primary firing at 800° C. for one hour in nitrogen, and the fired molding was impregnated with the composition D again and dried at room temperature for one hour.

Then the molding so dried was heated at a temperature-raising rate of 10° C./hr up to 250° C. in air to effect curing, and the cured molding was again fired at 1000° C. for one hour in nitrogen. The obtained fired body was black and dense and had a three-point bending strength of 9.3 kg/mm² and a bulk density of 1.8 g/cm³.

In the thermal shock test (ΔT=1000° C.), neither the appearance nor the bending strength of said fired body was changed at all.

EXPERIMENT 4b

A mixture comprising one part by weight of α-SiC powder (having an average particle size of 1μ) and one part by weigth of the composition D obtained in Example 4 was molded at a temperature of 800° C. under a pressure of 600 kg/cm² to obtain a molding having a size of 100 mm × 100 mm and a thickness of 2 mm.

Then the molding so obtained was heated at a temperature-raising rate of 200° C./hr up to 800° C. to effect primary firing, and the fired molding was impregnated with the composition D again. The impregnated molding was dried at room temperature for one hour and then heated at a temperature-raising rate of 10° C./hr up to 250° C. in air to effect curing.

Furthermore, the cured molding was fired again at 1200° C. for one hour in nitrogen to obtain a fired body having a bulk density of 3.0 g/cm³.

Even when the fired body was subjected to a thermal shock of ΔT of 1000° C., defects such as cracks were not formed, and the dense structure was retained.

INDUSTRIAL APPLICABILITY

As is apparent from the foregoing description, the heat-resistant and corrosion-resistant composition of the present invention, which comprises a metal alcoholate, a curing agent, a filler and an organic solvent and which is used as coating materials or binders for ceramics, has the following effects.

(1) When the composition is used as a coating material, the hardness and strength thereof are high and the heat resistance and corrosion resistance thereof are good.

Furthermore, low baking-curing temperature may be used (a strong coating can be formed at 20° to 25° C. within about one hour and baking can be accomplished at a temperature lower than 250° C.). Especially when the composition is applied on metals, carbon and ceramics, a high corrosion resistance can be given to these substrates.

(2) When the composition is used as a binder for ceramics, molding of ceramic materials in the form of a long thin sheet can be accomplished very easily, and in case of fiber-reinforced ceramics, ceramic products in the form of a long thin sheet or a pipe can be easily prepared by the same steps as those adopted in case of FRP.

We claim:

1. A heat-resistant, corrosion-resistant composition for coating materials consisting essentially of a metal alcoholate; a curing agent capable of being dehydrated by heating and a filler as solids, and an organic solvent, in which the amounts of the metal alcoholate, the curing agent and the filler are 25 to 70% by weight, 0.1 to 20% by weight and 10 to 60% by weight, respectively, based on 100% by weight of the total solids.

2. The composition according to claim 1 wherein the solvent is in an amount of 10 to 60 parts by weight per 100 parts by weight of the solids.

3. The composition according to claim 1, wherein the metal alcoholate has the formula (I)

$$M(OR)_l \qquad (I)$$

or a copolymer of a polycarbosilane of basic skeleton (SiHRCH₂) of degree of polymerization 5–50 and a metal alcoholate of formula I, wherein M is Zr, Al, Si or Ti, R is alkyl, phenyl or hydrogen, e is 3 or 4.

4. The composition according to claim 1 which has viscosity of 0.1–10 poise.

5. The composition according to claim 3 wherein M is Zr or Ti, the filler is a SiC powder of particular size 0.1 to 1000μ and the curing agent is boronhydroxide or aluminum hydroxide.

6. A heat-resistant, corrosion-resistant composition for binders for ceramics consisting essentially of a metal alcoholate, a curing agent capable of being dehydrated by heating and a filler as solids, and an organic solvent, in which the amounts of the metal alcoholate, the curing agent and the filler are 25 to 80% by weight, 0.1 to 20% by weight and 20 to 70% by weight, respectively, based on 100% by weight of the total solids.

7. A composition according to claim 6 wherein the solvent is incorporated in an amount of 10 to 50 parts by weight per 100 parts by weight of the solids.

* * * * *